United States Patent
Noble et al.

(10) Patent No.: US 8,281,126 B2
(45) Date of Patent: Oct. 2, 2012

(54) OUT OF BAND ENCRYPTION

(75) Inventors: Gayle L. Noble, Boulder Creek, CA (US); Lucy G. Hosking, Santa Cruz, CA (US)

(73) Assignee: Finisar Corporation, Sunnyvale, CA (US)

( * ) Notice: Subject to any disclaimer, the term of this patent is extended or adjusted under 35 U.S.C. 154(b) by 337 days.

(21) Appl. No.: 12/570,594

(22) Filed: Sep. 30, 2009

(65) Prior Publication Data

US 2010/0095110 A1   Apr. 15, 2010

Related U.S. Application Data

(60) Provisional application No. 61/101,257, filed on Sep. 30, 2008.

(51) Int. Cl.
*H04L 9/00* (2006.01)

(52) U.S. Cl. .......... 713/153; 380/278; 380/256; 380/44; 398/153; 702/190

(58) Field of Classification Search .................. None
See application file for complete search history.

(56) References Cited

U.S. PATENT DOCUMENTS

| | | | | |
|---|---|---|---|---|
| 7,436,965 B2 * | 10/2008 | Sherman | | 380/278 |
| 2005/0232643 A1 * | 10/2005 | Aronson et al. | | 398/183 |
| 2006/0072753 A1 * | 4/2006 | Nishimura | | 380/262 |
| 2008/0130887 A1 * | 6/2008 | Harvey et al. | | 380/256 |

* cited by examiner

*Primary Examiner* — Fikremariam A Yalew
(74) *Attorney, Agent, or Firm* — Maschoff Gilmore & Israelsen

(57) ABSTRACT

Embodiments of the invention relate to systems and methods for securing data transmission in networks. Embodiments of the invention further relate to encryption methods that dynamically adjust during the course of data transmission. Further, the encryption methods can adapt dynamically without user intervention. In one embodiment, an encryption scheme can be established, controlled, and monitored via out-of-band communication between transceiver modules.

18 Claims, 5 Drawing Sheets

OUT OF BAND ENCRYPTION

CROSS-REFERENCE TO RELATED APPLICATIONS

This application claims the benefit of U.S. Provisional Patent Application Ser. No. 61/101,257, filed Sep. 30, 2008, which is incorporated herein in its entirety by this reference. This application also claims the benefit of U.S. Provisional Patent Application Ser. 61/101,248, filed Sep. 30, 2008, which is incorporated herein in its entirety by this reference.

BACKGROUND

1. The Field of the Invention

The present invention relates to optical communication networks. More particularly, embodiments of the invention relate to systems and methods for independently establishing a data encryption scheme via out-of-band communication between transceiver modules in a network.

2. The Relevant Technology

Computing and networking technology have transformed our world. As the amount of information communicated over networks has increased, high speed transmission has become ever more critical. Many high speed data transmission networks rely on optical transceivers and similar devices for facilitating transmission and reception of digital data embodied in the form of optical signals over optical fibers. Optical networks are thus found in a wide variety of high speed applications ranging from modest Local Area Networks ("LANs") to backbones that define a large portion of the infrastructure of the Internet.

One challenge that is increasingly encountered with optical networking components involves maintaining the security of the traffic on the network. Depending on the environment in which a network is maintained and the particular security concerns associated therewith, there is a need at times to protect the data transmitted between network components.

The subject matter claimed herein is not limited to embodiments that solve any disadvantages or that operate only in environments such as those described above. Rather, this background is only provided to illustrate one exemplary technology area where some embodiments described herein may be practiced

BRIEF SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Embodiments of the invention relate to systems and methods for securing data transmission in networks. Embodiments of the invention further relate to encryption methods that dynamically adjust during the course of data transmission. Further, the encryption methods can adapt dynamically without user intervention. In one embodiment, an encryption scheme can be established, controlled, and monitored via out-of-band communication between transceiver modules.

Embodiments of present invention involve a method in which the encryption scheme employed by communicating transceiver modules is independently determined by the transceiver modules themselves via out-of-band data transmissions between the two modules. Security is maintained between the modules in a network by sending identification and authentication information using the out-of-band data channel. Hardware or software encoded encryption keys exist on the modules within the network and can be used to generate identification information or encrypted tokens for presenting to other modules in a network. Thus a secure connection can be implemented between modules where those modules are appropriately matched to one another using hardware embedded encryption keys and the out-of-band data to communicate authentication and identification information.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Reference will now be made to the drawings to describe various aspects of exemplary embodiments of the invention. It should be understood that the drawings are diagrammatic and schematic representations of such exemplary embodiments and, accordingly, are not limiting of the scope of the present invention, nor are the drawings necessarily drawn to scale.

FIGS. 1-5 depict various features of embodiments of the present invention, which is generally directed to systems and methods in which the encryption scheme employed by communicating transceiver modules is independently determined by the transceiver modules themselves via out-of-band data transmissions between the two modules. While embodiments of the invention will be discussed in the context of transceiver or optoelectronic device authentication, those of skill in the art will recognize that the principles of the present invention may be implemented in the encrypted communication of other electronics devices and may relate to optical and/or electrical communications.

Figure 1:
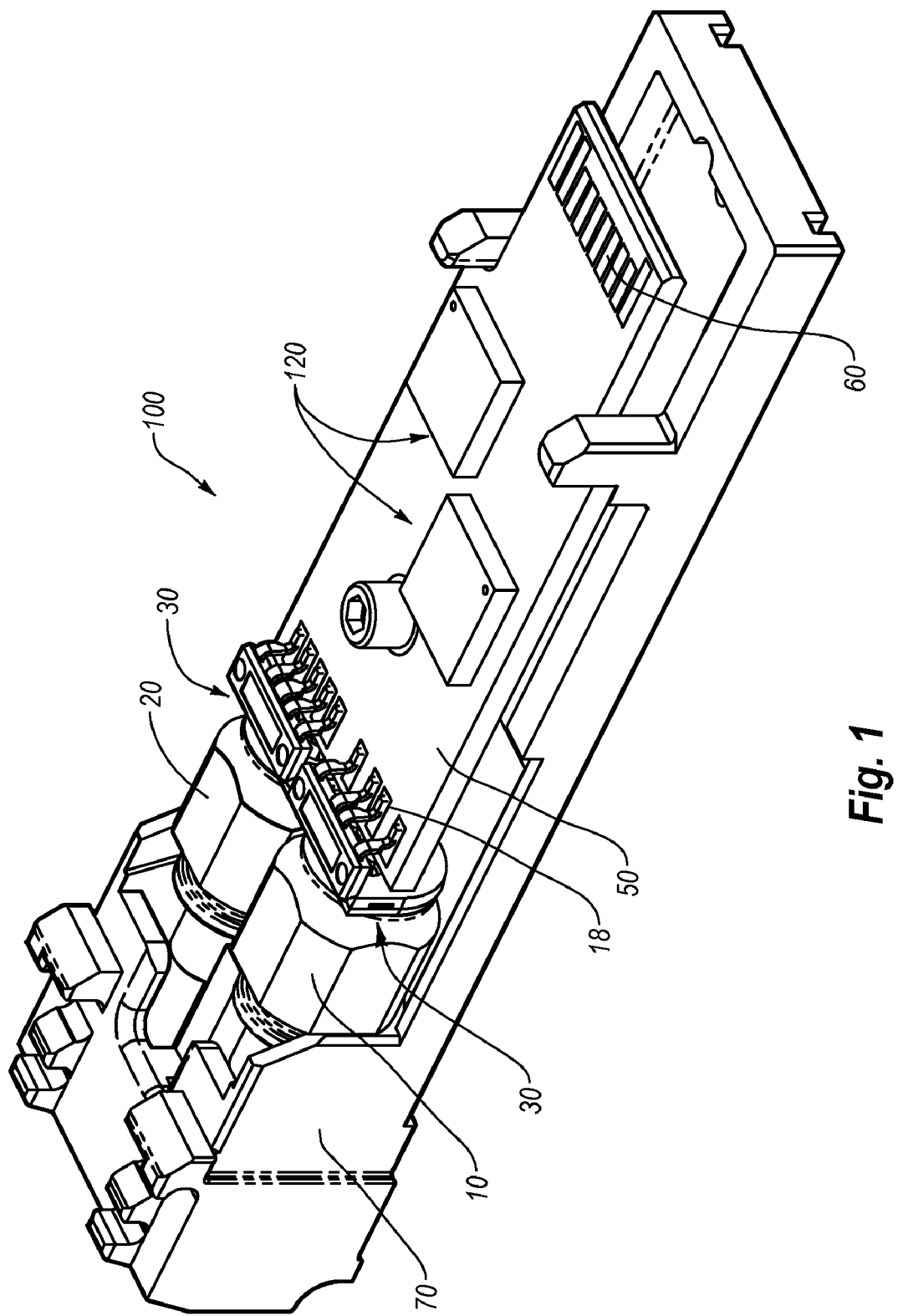
FIG. 1 is a perspective view of an optical transceiver module including various components that are employed in connection with an embodiment of the present invention.

Embodiments of out of band encryption can be implemented using various devices including optical devices, electrical devices, and/or optoelectronic devices. As used herein, the term "optoelectronic device" includes devices having both optical and electrical components. Examples of optoelectronic devices include, but are not limited to transponders, transceivers, transmitters, and/or receivers. Accordingly, FIG. 1 illustrates an embodiment of a transceiver module that may be used to implement aspects of securing network communications, including out-of-band encryption. FIG. 1 shows a transceiver module 100 for use in fiber optic communications. While the optical transceiver 100 will be described in some detail, the optical transceiver 100 is described by way of illustration only, and not by way of restricting the scope of the invention. Embodiments of the invention are suitable for 1G, 2G, 4G, 8G, 10G, 40G, 50G, 100G and higher bandwidth fiber optic links. Furthermore, embodiments of the present invention may be implemented in optoelectronic devices of any form factor including, but not limited to SFF, SFP, XFP, or the like, without restriction.

As depicted, the transceiver shown in FIG. 1 includes various components, including a receiver optical subassembly ("ROSA") 10, a transmitter optical subassembly ("TOSA") 20, lead frame connectors 30, an integrated circuit controller 120, and a printed circuit board 50. In this example, two lead frame connectors 30 are included in the transceiver 100, one each used to electrically connect the ROSA 10 and the TOSA 20 to a plurality of conductive pads 18 located on the printed circuit board 50. The controller 120 is also operably attached to the printed circuit board 50. An edge connector 60 is located on an end of the printed circuit board 50 to enable the transceiver 100 to electrically interface with a host. The printed circuit board 50 facilitates electrical communication between the ROSA 10/TOSA 20, and the host. In addition, the above-mentioned components of the transceiver 100 are partially housed within a housing portion 70. The housing portion 70 may include a base with a shell define a covering for the components of the transceiver 100.

As illustrated in FIG. 1, printed circuit board 50 includes circuitry and electronic components for use with the TOSA 20 and ROSA 10 in performing the optical signal transmission and reception activities of the transceiver 100. Among the components of the printed circuit board 50 are a laser driver, a post amplifier and a controller. It will be appreciated that one or more of these components can be integrated on a single chip, or can be separately disposed on the printed circuit board 50. Alternatively, some of these components such as the laser driver, transimpedance amplifier, photodiode, and the like may be disposed inside of the TOSA 20 or ROSA 10.

Figure 2:
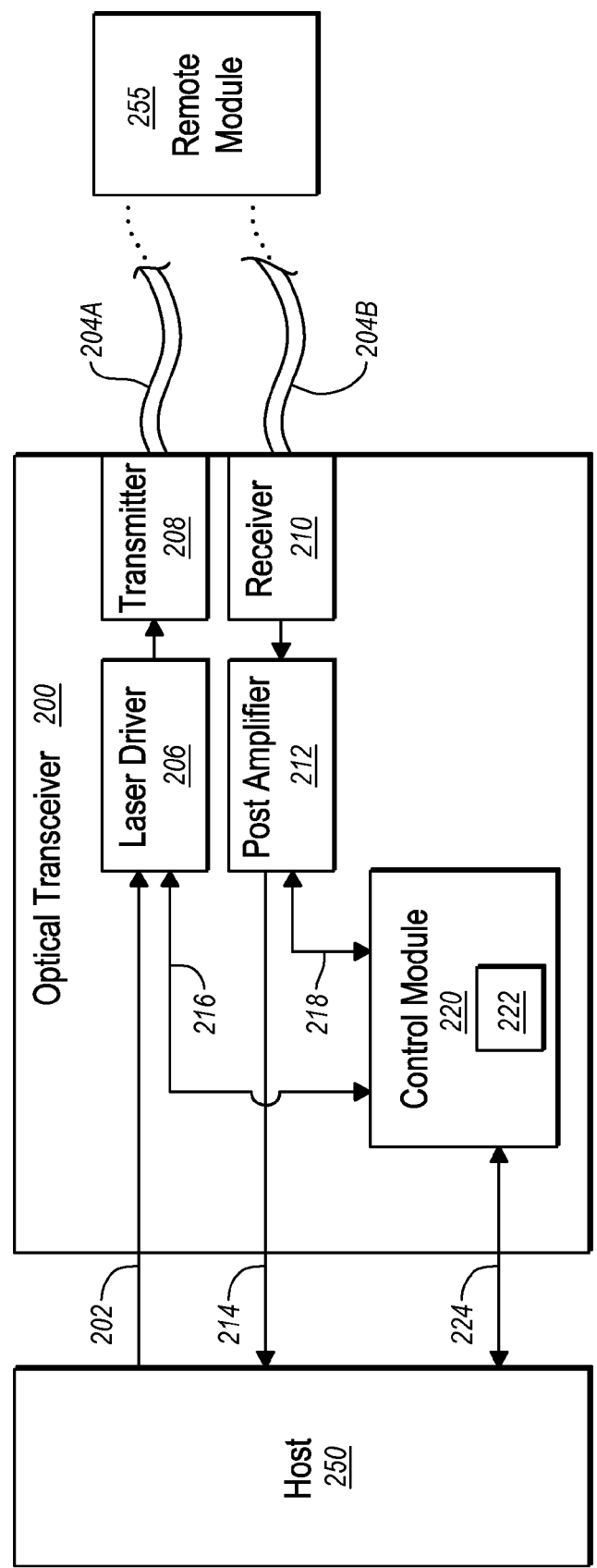
FIG. 2 schematically illustrates an exemplary optical transceiver that may implement features of the present invention.

Reference is now made to FIG. 2, which illustrates a block diagram of an optical transceiver that provides secure communications over a network. In this example, the transceiver 200 is configured to determine an encryption scheme by communicating with a remote transceiver 255. In one example, the transceiver 200 determines the encryption scheme by communicating via out-of-band transmissions.

During operation, the transceiver 200 can receive a data-carrying electrical signal 202 from the host 250, which can be any computing system capable of communication with the optical transceiver 200, for transmission as a data-carrying optical signal on to an optical fiber 204A using a transmitter 208, which may correspond to the TOSA 20 of FIG. 1 in one embodiment. In addition, the transceiver 200 is configured to receive a data-carrying optical signal from an optical fiber 204B using an optical receiver 210, which may correspond to the ROSA 10 of FIG. 1 in one example. Whereas the use of transceivers to transmit and receive data-carrying electrical and/or optical signals is well-known in the art, it will not be described in greater detail to avoid unnecessarily obscuring the invention.

In one embodiment, the transceiver 200 includes a controller 220, which can be used for, among other things, optimizing the performance of the transceiver 200. The controller 220 may include one or more general purpose processors, illustrated as processor 222 or other computing devices such as a programmable logic device ("PLD"), application specific integrated circuit ("ASIC"), or field programmable gate array ("FPGA"). The processor 222 recognizes instructions that follow a particular instruction set, and may perform normal general-purpose operations such as shifting, branching, adding, subtracting, multiplying, dividing, Boolean operations, comparison operations, and the like. In one embodiment, the processor 222 may be a 16-bit processor or a 32-bit processor. The controller may additionally include an internal controller memory, which may be Random Access Memory (RAM) or nonvolatile memory. While the internal controller memory may be RAM, it may also be a processor, register, flip-flop or other memory device.

The controller 220 may have access to a persistent memory external to the controller 220, which in one embodiment is an electrically erasable programmable read-only memory (EEPROM). Persistent memory may also be any other nonvolatile memory source. The persistent memory and the control module 220 may be packaged together in the same package or in different packages without restriction.

Data may be exchanged between the controller 220 and host 250 using an appropriate interface or bus 224. In one embodiment, I²C is implemented as the data interface protocol between the host 250 and the controller 220 and data and clock signals may be provided from the host 250 using a serial clock line and a serial data line, both of which are represented in FIG. 2 by the bus 224. However, the principles of the present invention may also be implemented in systems which utilize MDIO, 1-wire, or any other data interface protocol between the host 250 and the controller 220.

Securing data for transmission over a network may include modulating high-speed data and out-of-band data as a double modulated signal. The double modulated signal is transmitted on a physical link between transceivers modules and/or other components in a network of connected components/hosts. High-speed data refers to data typically transmitted on a network such as the data typically transmitted for the benefit of the various hosts on a network. High-speed data may also be referred herein as in-band data which is a reference to the communication band typically used by host systems to communicate data. High-speed and in-band data are distinguished from out-of-band data which is typically used to transmit data from transceiver to transceiver for the use of the transceivers. The term "high-speed data," as used herein, does not refer to any particular defined bandwidth or frequency of data.

Out-of-band data can be modulated onto a signal carrying high-speed data that is ordinarily transmitted on a physical link, thus creating a double modulated signal on the physical link. This allows for the independent transmission of authentication and/or encryption information between modules. Out-of-band data may be transmitted across a network switch according to methods described in more detail in application Ser. No. 61/101,248, which has been previously incorporated by reference herein. While a host may subsequently receive the out-of-band data, the host usually receives the out-of-band data from a transceiver through a bus such as an I²C or MDIO bus. This is contrasted to high-speed data which is typically received by a host from a transceiver through some high-speed data interface. Notably, a host may also produce the out-of-band data and transmit the out-of-band data to a transceiver on a different bus or different data lines.

Figure 3:
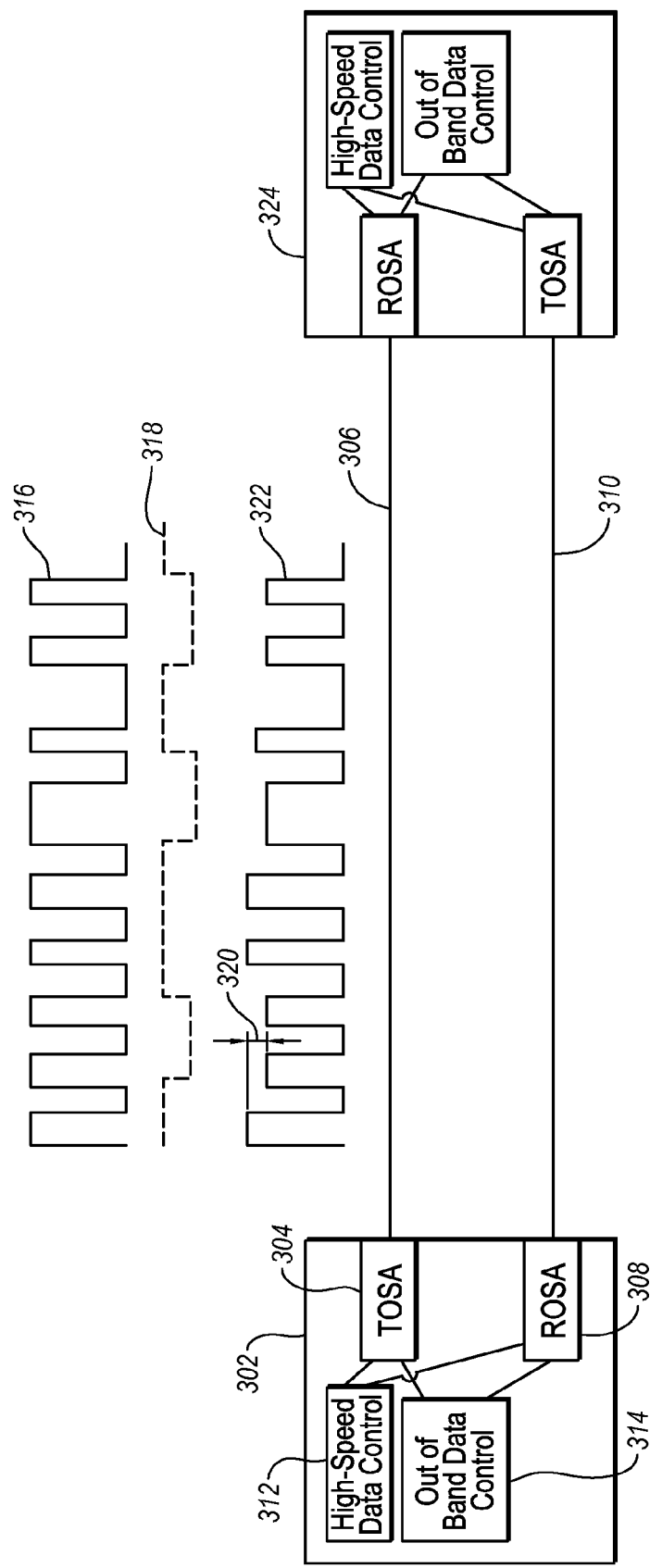
FIG. 3 illustrates a connection between two transceiver modules for communicating high-speed and out-of-band data.

FIG. 3 illustrates a connection between a local transceiver module 302 and a remote transceiver module 324 for communicating high-speed and out-of-band data. The local transceiver module 302 includes a transmitter optical subassembly (TOSA) 304 for transmitting signals across a physical link 306. The local transceiver module 302 also includes a receiver optical subassembly (ROSA) 308 for receiving optical signals across a physical link 310. The TOSA 304 is connected to a high-speed data control 312, which may include a high-speed modulator that modulates the power output of a signal power source such as a laser in the TOSA 304 such that the high-speed data is converted to a form that can be transmitted across the physical link 306. As shown in FIG. 3, the high-speed data control 312 modulates the TOSA 304 to produce a high-speed physical layer data signal 316. Also connected to the TOSA 304 is an out-of-band data control 314. The out-of-band data control 314 further modulates the laser in the TOSA 304 using an out-of-band data modulator such that an out-of-band data stream 318 is modulated onto the high-speed data signal 316 to produce an outgoing double modulated signal 322 that includes high-speed and out-of-band data.

In the example shown, the modulations of the out-of-band data appear as a change in peak power 320 of the outgoing double modulated signal 322. Thus the outgoing double modulated signal 322 includes both high-speed data and out-of-band data. The out-of-band data may be modulated using a number of different modulation techniques including but not limited to amplitude modulation, frequency modulation, phase shift keying, binary phase shift keying, quadrature phase shift keying, and Manchester encoding. The out-of-band data may actually have a frequency range that is orders of magnitude less than the in-band data. However, to illustrate the principle of double modulation in a simple graphical form, the frequency of the out-of-band data stream 318 is illustrated in FIG. 3 as having only a slightly lower frequency than the high-speed data signal 316. Regardless, the principles of the present invention are not limited to the relative frequency between the out-of-band data stream 318 and the high-speed data signal 316.

To perform receiving functions, the ROSA 308 includes a signal reception element such as a photodiode that receives an incoming double modulated signal. The ROSA 308 sends all or portions of the incoming double modulated signal to the out-of-band data control 314 and the high-speed data control 312. The out-of-band data control 314 may include an out-of-band detector that extracts the out-of-band data from the incoming double modulated signal. The high-speed data control 312 may include a high-speed data amplifier that extracts high-speed data from the incoming double modulated signal.

In the example shown in FIG. 3, the encryption scheme employed by the transceiver modules is determined via out-of-band communication between the two modules. Security is maintained between devices in a network by sending identification and authentication information using the out-of-band data. Hardware or software encoded encryption keys exist on devices within the network which can be used to generate identification information or encrypted tokens for presenting to other devices in a network. Thus a secure connection can be implemented between devices where those devices are appropriately matched to one another using hardware embedded encryption keys and the out-of-band data to communicate authentication and identification information.

Typically, an authorized transceiver module manufacturer will establish a prior agreement as to a key and a cryptography algorithm to implement. In order to prevent unauthorized parties from obtaining the key, the key is typically provided to the transceiver module prior to the manufacturer shipping out the device. Providing the key to the transceiver module may include programming the key into a processor, PLD, ASIC, FPGA, or other computing module of the transceiver module. The processor, PLD, ASIC, or FPGA can then be read-protected, thereby preventing the key from being read out by an unauthorized party. The key can similarly be programmed into and read-protected in a processor, PLD, ASIC, FPGA, or other computing module of the host to prevent an unauthorized party from obtaining the key from the host.

Figure 4:
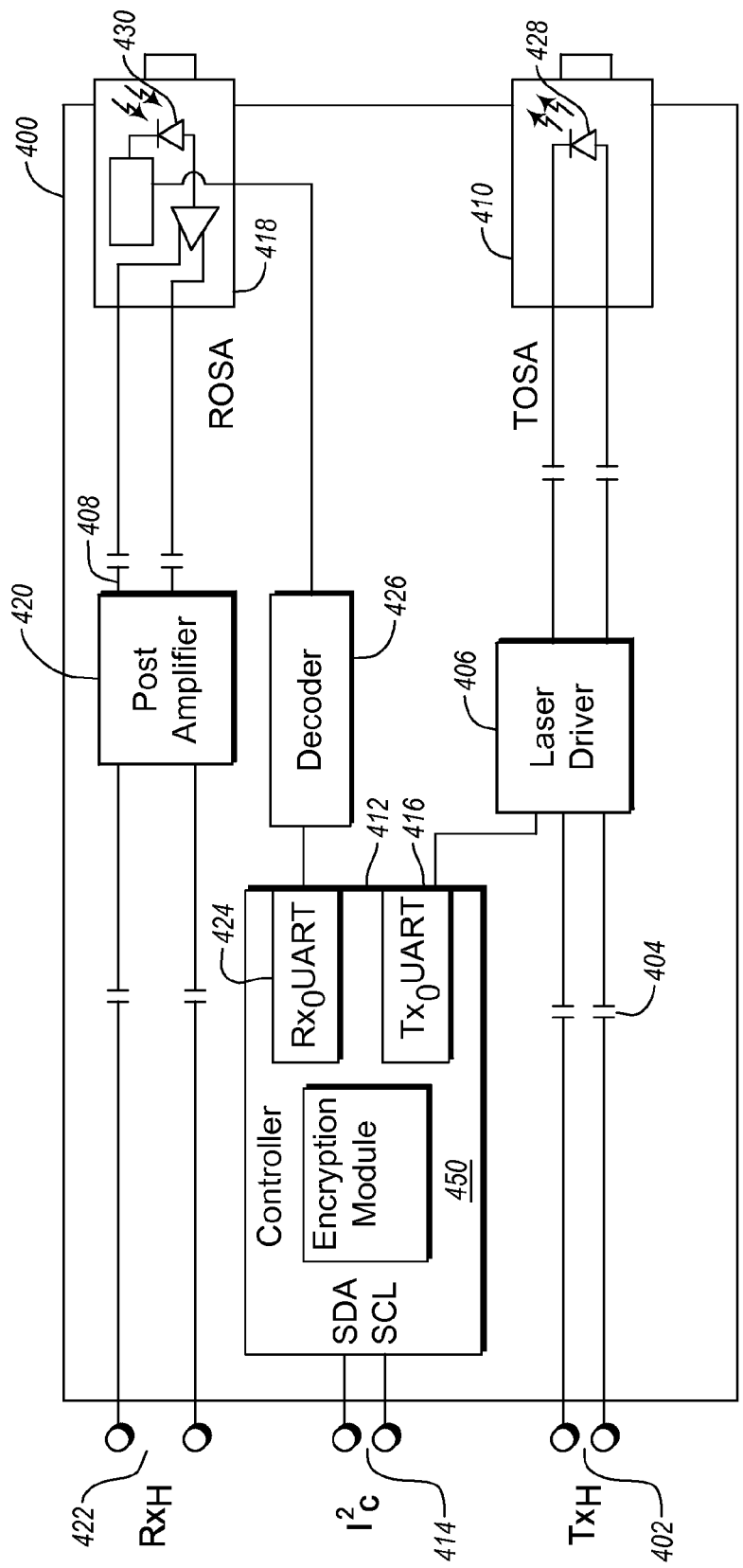
FIG. 4 illustrates a transceiver module including components for sending and receiving encrypted high-speed data and encrypted out-of-band data.

Referring now to FIG. 4, an embodiment of the invention that includes a transceiver for receiving and transmitting encryption out-of-band data is shown. The transceiver 400 includes a high-speed transmit port 402 for receiving high-speed electronic data. The high-speed electronic data may be received from a host device in which the transceiver 400 is installed. The high-speed electronic data is transmitted through filtering capacitors 404 to a laser driver 406. The laser driver amplifies the high-speed electronic data to produce a driving signal which is then passed to a TOSA 410 that converts the driving signal into optical data. The laser driver 406 is further connected to a controller 412. Out-of-band encryption-related data may be produced within the transceiver 400 by the controller 412 or other circuitry in the transceiver. The data is sent to the encryption module 450 within the controller 424 for encryption using the established key.

The encryption module 450 may comprise hardware, software, or any combination of hardware and software. In some embodiments, the encryption module 450 may perform various encryption algorithms depending on design constraints and desired tradeoffs. For example, the encryption algorithm may be publicly available, like the SFF-8472 standard. To increase security, the algorithm may use a sufficiently long encryption key to ensure against attacks such as brute-force attacks that analyze unencrypted and encrypted data set pairs. An encryption algorithm having a relatively simple implementation may be selected in view of the frequently limited computational power and memory available in an optical transceiver. A block cipher, such as Advanced Encryption Standard ("AES"), which has been standardized by the U.S. government, may be used. See Federal Information Processing Standards Publication 197, Advanced Encryption Standard (AES), Nov. 26, 2001. The AES cipher may work with 128-bit data sets and can use keys of length 128, 192 or 256 bits.

The controller delivers the data received from the encryption module 450 through an out-of-band transmission UART 416 to the laser driver 406. Embodiments of the invention also contemplate out-of-band data being produced in whole or in part, by the host device and transferred across the I2C bus 414 to the controller 424. Thus, out-of-band data may derive from multiple sources including a host device, or directly from functions performed within a transceiver.

The laser driver 406 encodes the out-of-band data received from the controller 424 onto the driving signal for driving the TOSA 410 and ultimately a laser 428 such that out-of-band data is modulated together with a high-speed data signal which is then output as an outgoing double modulated optical signal from the TOSA 410.

Optical data is received by the transceiver 400 at the ROSA 418. The optical data may be an incoming double modulated optical signal that includes both high-speed data and out-ofband data. The optical signal is converted to an electronic signal by the ROSA 418. The post amplifier 420 extracts high-speed electronic data which is then fed to a high-speed output port 422 where the high-speed data is made available to a host device in which the transceiver 400 is installed. A decoder 426 extracts out-of-band data from an electronic signal generated by a photodiode current monitor 430 in the ROSA 518 which is then fed into an out-of-band reception UART 424 to the encryption module 450 for decryption. The decoder 526 may also include demodulation functionality when the out-of-band data has been modulated using some modulation technique. The out-of-band data, in this example, is modulated at some low frequency. Low frequency as used in this context does not specify any defined bandwidth other than a bandwidth lower than the high-speed data.

In this example, the encryption module 450 may utilize a public/private key encryption scheme upon initial communication with a remote transceiver. In public/private key cryptography, separate keys are used to encrypt and decrypt a message. The encryption key (public key) need not be kept secret and can be published. The decryption or private key must be kept secret to maintain confidentiality.

In some embodiments, the high speed data received from the host device in which the transceiver 400 is installed may also be encrypted using a public/private key encryption scheme. In such embodiments, the encryption module 450 may be configured to access the high speed data received at high-speed transmit port 402. Alternatively, a separate encryption module may access the high speed data received at high-speed transmit port 402. The encryption module will use the encryption key to encrypt the high-speed data before sending it to the remote transceiver. As will be appreciated, the encrypted high-speed data may also be doubled modulated with the encrypted out-of-band data using the out-of band methods previously described.

In addition, the transceiver 400 may also receive encrypted data from the remote transceiver. In such cases, the encryption module 450 or some other encryption module, may access the received encrypted data and may use a private key to decrypt the data prior to sending it to the host. Of course, the transceiver 400 may also decrypt any out-of-band data that has been modulated onto the received encrypted data using the methods previously described.

Figure 5:
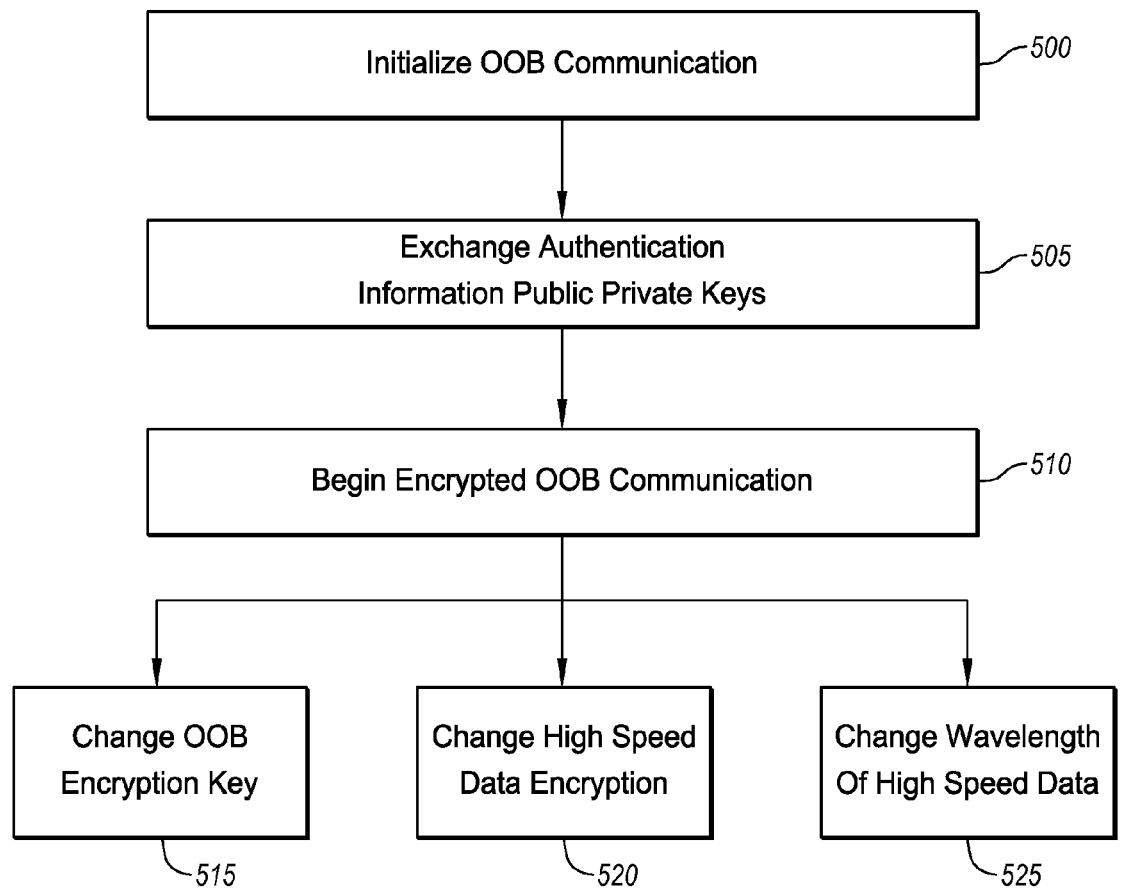
FIG. 5 illustrates a flowchart of an example method that may be used for implementing an encryption scheme via out-of-band communication between transceiver modules.

FIG. 5 illustrates a flowchart of an example method that may be used for implementing an encryption scheme via out-of-band communication between transceiver modules. The local transceiver and the remote transceiver initialize 500 out-of-band communication. Next, via out-of-band communication, the transceivers exchange 505 authentication information, which may involve the use of public/private keys. The encryption method may be a portion of code or logic designed to encrypt a data string according to a particular encryption algorithm. Generally speaking, any cryptography algorithm that has been or will be created can be implemented as the particular encryption algorithm. To improve the strength of authentication, the algorithm key size used by the encryptors can be 128 bits or larger.

Once the encrypted out-of-band communication channel has been established 510, any number of encryption schemes may be independently implemented by the transceiver modules. The out-of-band encrypted communication channel may be used to exchange secure communications-related information between the transceivers.

The transceivers may be programmed to change 515 the out-of-band encryption key. A transceiver module may randomly generate a new encryption key which is known only to the transceiver which it is in communication with, and unknown to anyone else including the module manufacturer. The new encryption key may be generated within a local transceiver and communicated out-of-band to a remote transceiver, thereby obviating the need to disclose the key to any other network component, including the host. Only the communicating transceiver modules know the encryption key being used at any given point. Since the new encryption key is independently generated with the transceivers and not predetermined or preprogrammed by a module manufacturer, the possibility that the new encryption key would be intercepted is significantly reduced if not eliminated.

Further, the process of independently changing the encryption key may be repeated as often as is necessary to ensure network security. A transceiver module may be programmed to change the encryption key on a periodic or random basis. When an unauthorized user attempts to gain access to the network by deciphering the encryption key, a new encryption key may be randomly generated and implemented, rendering the unauthorized user's deciphered key useless.

The encrypted out-of-band communication channel may also be used to change 520 the encryption scheme of the high-speed data being transmitted between the modules. Again, the encryption key may be changed as often as necessary to prevent an unauthorized user from gaining access to the network or to the data being communicated over by the transceiver or for other reasons, including a predetermined schedule for changing keys.

Securing communication may also include changing 525 the wavelength of the high speed data signal. This can be achieved using the encrypted out-of-band communication channel. In fiber-optic applications, wavelength-division multiplexing (WDM) is a technology which multiplexes multiple optical carrier signals on a single optical fiber by using different wavelengths of light to carry different signals. This allows for a multiplication in capacity, in addition to enabling bidirectional communications over one strand of fiber. WDM enables the utilization of a significant portion of the available fiber bandwidth by allowing many independent signals to be transmitted simultaneously on one fiber, with each signal located at a different wavelength. WDM is a form of frequency division multiplexing (FDM) but is commonly known in the art as wavelength division multiplexing.

Utilizing principles of the present invention in a WDM-capable network, an encrypted out-of-band communication channel may be used by the transceiver modules to change the wavelength on which the high-speed data resides. Changing the particular wavelength of the high-speed data signal helps to ensure secure communications. Where an unauthorized user had surreptitiously gained access to a signal on a particular wavelength, changing the wavelength on which that signal resides would cause the unauthorized user to lose access to the signal and the data contained within that signal.

The efforts of an unauthorized user may be further obfuscated by fabricating false data on the remaining wavelengths on the fiber. Transmitting false or "decoy" data on the remaining wavelengths further ensures the security of the data because only the communicating transceivers know the particular wavelength on which the real high-speed data resides. The decoy data on the unused wavelengths may also be encrypted with a different encryption key which would have the effect of further confusing an authorized user attempting to gain access to the high-speed data. Similar to the process of changing the encryption key, the process of changing the wavelength on which the high-speed data resides may be performed as often as is necessary to maintain the security of the network.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In an optical communication network including a local transceiver module capable of communicating via out-of-band data on a high-speed signal with a remote transceiver module, a method for independently determining an encryption scheme, the method comprising:
    initiating high-speed communication between the local transceiver module and the remote transceiver module;
    initiating out-of-band communication between the local transceiver module and the remote transceiver module;
    performing an authentication handshake using a predetermined public/private key between the local transceiver module and the remote transceiver module via out-of-band communication;
    initiating encrypted out-of-band communication between the local transceiver module and the remote transceiver module; and
    communicating encryption scheme change information between the local transceiver module and the remote transceiver modules using the encrypted out-of-band communication, wherein the encryption scheme change information is known only to the local transceiver module and the remote transceiver module, and wherein the encryption scheme change information includes instructions to change a wavelength of the high-speed communication to a new wavelength.

2. The method as recited in claim 1, wherein the encryption scheme change information further includes a new encryption key that is used to encrypt the out-of-band data.

3. The method as recited in claim 2, wherein the new encryption key is generated at the local transceiver module.

4. The method as recited in claim 3, wherein the local transceiver module is programmed to generate the new encryption key on a periodic basis or on a random basis.

5. The method as recited in claim 1, further comprising:
    initiating encrypted high-speed communication between the local and remote transceiver modules.

6. The method as recited in claim 5, wherein the encryption scheme change information further includes a new encryption key that is used to encrypt the high-speed communication.

7. The method as recited in claim 6, wherein the new encryption key is generated at the local transceiver module.

8. The method as recited in claim 7, wherein the local transceiver module is programmed to generate the new encryption key on a periodic basis or on a random basis.

9. The method in accordance with claim 1, further comprising:
    fabricating false high-speed data on one or more wavelengths that are different from the new wavelength of the high-speed communication; and
    transmitting the false high-speed data on the one or more wavelengths.

10. A transceiver module comprising:
    a transmitter optical subassembly;
    a receiver optical subassembly;
    an encryption module associated with an encryption key;
    a high-speed data control module; and
    an out-of-band data control module;
    wherein the transceiver is configured to perform the steps of:
        initializing high-speed communication with a remote transceiver module coupled to the transceiver module;
        initializing encrypted high-speed communication with the remote transceiver module;
        initializing out-of-band communication with the remote transceiver module;
        performing an authentication handshake using a predetermined public/private key with the remote transceiver module via out-of-band communication;
        initializing encrypted out-of-band communication with the remote transceiver module; and
        communicating encryption scheme change information with the remote transceiver module using the encrypted out-of-band communication, wherein the encryption scheme change information is known only to the transceiver module and the remote transceiver module, and wherein the encryption scheme change information includes instructions to change a wavelength of the high-speed communication or the encrypted high-speed communication to a new wavelength.

11. The transceiver module as recited in claim 10, wherein the out-of-band control is an out-of-band detector that extracts out-of band data from double modulated high-speed data.

12. The transceiver module as recited in claim 10, wherein the encryption scheme change information further includes a new encryption key that is used to encrypt the out-of-band communication.

13. The transceiver module as recited in claim 12, wherein the transceiver module is further configured to perform the step of generating the new encryption key.

14. The transceiver module as recited in claim 13, wherein the transceiver module is further configured to perform the step of generating the new encryption key on a periodic basis or on a random basis.

15. The transceiver module as recited in claim 10, wherein the encryption scheme change information further includes a new encryption key that is used to encrypt the high-speed communication.

16. The transceiver module as recited in claim 15, wherein the transceiver module is further configured to perform the step of generating the new encryption key.

17. The transceiver module as recited in claim 16, wherein the transceiver module is further configured to perform the step of generating the new encryption key on a periodic basis or on a random basis.

18. A transceiver module comprising:
    a transmitter optical subassembly;
    a receiver optical subassembly;
    an encryption module associated with an encryption key;
    a high-speed data control module; and
    an out-of-band data control module;
    wherein the transceiver is configured to perform the steps of:
        initializing high-speed communication with a remote transceiver module coupled to the transceiver module;
        initializing encrypted high-speed communication with the remote transceiver module;
        initializing out-of-band communication with the remote transceiver module;

performing an authentication handshake using a predetermined public/private key with the remote transceiver module via out-of-band communication;
initializing encrypted out-of-band communication with the remote transceiver module;
coordinating a change to the encryption scheme with the remote transceiver module using the encrypted out-of-band communication;

fabricating false high-speed data on one or more wavelengths that are different from a wavelength of the encrypted high-speed communication; and
transmitting the false high-speed data on the one or more wavelengths.

\* \* \* \* \*